US008254933B2

(12) United States Patent
Choi et al.

(10) Patent No.: US 8,254,933 B2
(45) Date of Patent: Aug. 28, 2012

(54) APPARATUS AND METHOD FOR HANDOVER BETWEEN A HETEROGENEOUS COMMUNICATION SYSTEM AND A BROADBAND WIRELESS COMMUNICATION SYSTEM

(75) Inventors: Young-Hak Choi, Seoul (KR);
Pyeong-Hwan Wee, Seoul (KR);
Sang-Jun Lee, Yongin-si (KR);
Jae-Yeong Kwon, Suwon-si (KR);
Sang-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1023 days.

(21) Appl. No.: 12/029,809

(22) Filed: Feb. 12, 2008

(65) Prior Publication Data
US 2008/0194262 A1 Aug. 14, 2008

(30) Foreign Application Priority Data
Feb. 12, 2007 (KR) .................. 10-2007-0014280

(51) Int. Cl.
*H04Q 7/20* (2006.01)
(52) U.S. Cl. ..................... 455/437; 370/331
(58) Field of Classification Search .......... 455/436–437; 370/331
See application file for complete search history.

(56) References Cited

U.S. PATENT DOCUMENTS

| | | | |
|---|---|---|---|
| 5,684,384 A | 11/1997 | Barkat et al. | |
| 6,081,096 A | 6/2000 | Barkat et al. | |
| 6,879,134 B2 | 4/2005 | Stanesti et al. | |
| 7,092,709 B1 * | 8/2006 | Honkala et al. | 455/432.1 |
| 2005/0221824 A1 | 10/2005 | Lee et al. | |
| 2006/0035639 A1 * | 2/2006 | Etemad et al. | 455/436 |
| 2006/0121901 A1 * | 6/2006 | Tanaka et al. | 455/436 |
| 2006/0246903 A1 * | 11/2006 | Kong et al. | 455/437 |
| 2007/0021119 A1 * | 1/2007 | Lee et al. | 455/436 |

FOREIGN PATENT DOCUMENTS

| | | | |
|---|---|---|---|
| CN | 1150712 A | | 5/1997 |
| CN | 2663203 Y | | 12/2004 |
| CN | 1578045 A | | 2/2005 |
| KR | 2005120477 | * | 12/2005 |
| KR | 10-2006-0043314 A | | 5/2006 |

\* cited by examiner

*Primary Examiner* — Charles Shedrick
(74) *Attorney, Agent, or Firm* — Jefferson IP Law, LLP

(57) ABSTRACT

An apparatus and a method for handover between a broadband wireless communication system and a heterogeneous communication system are provided. An operating method of a base station for the handover between a broadband wireless communication system and a and a heterogeneous communication system includes when a terminal enters a border cell, sending a message requesting to measure a signal level of a downlink, to the terminal, when a signal level measured by the terminal falls below a preset threshold, requesting a handover, to a corresponding heterogeneous communication system, over a core network, receiving a message, including channel allocation information for the handover, from the corresponding heterogeneous communication system, and forwarding the message, including the channel allocation information, to the terminal. Hence, when the terminal gets out of the service coverage area of the broadband wireless communication system, it can be handed over to the heterogeneous communication system seamlessly.

24 Claims, 14 Drawing Sheets

APPARATUS AND METHOD FOR
HANDOVER BETWEEN A
HETEROGENEOUS COMMUNICATION
SYSTEM AND A BROADBAND WIRELESS
COMMUNICATION SYSTEM

PRIORITY

This application claims the benefit under 35 U.S.C. §119 (a) of a Korean patent application filed in the Korean Intellectual Property Office on Feb. 12, 2007 and assigned Serial No. 2007-14280, the entire disclosure of which is hereby incorporated by reference.

BACKGROUND OF THE INVENTION

1. Field of the Invention

The present invention relates to an apparatus and a method for handover between heterogeneous networks in a broadband wireless communication system. More particularly, the present invention relates to an apparatus and a method for seamless handover from a border cell of a broadband wireless communication system to a heterogeneous network.

2. Description of the Related Art

High speed Internet services allow a user to access the Internet at a high data rate (at 1 Mbps or so). The high speed Internet services originated with wired services for a stationary user. However, the high speed Internet services have been extended to be provided wirelessly at anytime and anywhere to a mobile user using a portable terminal. Currently, high speed Internet services are supported by broadband wireless communication systems based on Institute of Electronics and Electrical Engineers (IEEE) 802.16 or wireless communication systems based on Wideband Code Division Multiple Access (WCDMA)/High Speed Downlink Packet Access (HSDPA).

While broadband wireless communication systems are used to service dense urban areas, heterogeneous communication systems (WCDMA/HSDPA or EVolution Data Only (EV-DO)) are used to service any area. Accordingly, in the broadband wireless communication system, a region between dense urban areas would not be serviced unless a base station is installed in that region. By contrast, in the heterogeneous communication system, a terminal would be serviced in every area. Hence, when the terminal travels outside the coverage of the broadband wireless communication system in the region between the dense urban areas, a call drop occurs. After the call drop, the terminal is no longer serviced unless it re-enters the broadband wireless communication system. If the terminal is a dual-mode dual-band terminal which can be serviced by both the heterogeneous communication system and the broadband wireless communication system, the terminal attempts to reconnect the call through the heterogeneous communication system after the call drop occurred in the broadband wireless communication system. However, when the dual-mode dual-band terminal travels outside the service coverage area of the broadband wireless communication system and suffers the call drop, there are no apparatus and method for handover between the broadband wireless communication system and the heterogeneous networks without service interruption.

With advances in mobile communications, $2.5^{th}$ generation, $3^{rd}$ generation and $4^{th}$ generation networks coexist and ability to provide a dual-mode dual-band function requires accessibility to various communication networks. Therefore, when a dual-mode dual-band terminal gets out of a service coverage area of a broadband wireless communication system, what is needed is an apparatus and a method for seamless handover to a heterogeneous communication system.

SUMMARY OF THE INVENTION

An aspect of the present invention is to address at least the above mentioned problems and/or disadvantages and to provide at least the advantages described below. Accordingly, an aspect of the present invention is to provide an apparatus and a method for handover between a broadband wireless communication system and a heterogeneous communication system.

Another aspect of the present invention is to provide an apparatus and a method for handover between a broadband wireless communication system and a heterogeneous communication system through a periodic signal strength report in a border cell in of the broadband wireless communication system.

Yet another aspect of the present invention is to provide an apparatus and a method for handover between a broadband wireless communication system and a heterogeneous communication system when a terminal is handed over to a dummy cell in a broadband wireless communication system.

Still another aspect of the present invention is to provide an apparatus and a method for handover between a broadband wireless communication system and a heterogeneous communication system using a state of an active set in a broadband wireless communication system.

The above aspects are addressed by providing an operating method of a base station for a handover between a broadband wireless communication system and a heterogeneous communication system. The operating method includes when a terminal enters a border cell, sending a message requesting to measure a signal level of a downlink, to the terminal, when a signal level measured by the terminal falls below a preset threshold, requesting a handover, to a corresponding heterogeneous communication system, over a core network, receiving a message, including channel allocation information for the handover, from the corresponding heterogeneous communication system, and forwarding the message, including the channel allocation information, to the terminal.

According to one aspect of the present invention, an operating method of a terminal for a handover between a broadband wireless communication system and a heterogeneous communication system is provided. The method of the terminal includes receiving a message, requesting a measurement of a signal level of a downlink, from a base station, sending a message, reporting of the signal level of the downlink, to the base station, receiving a message, including channel allocation information for a handover to a heterogeneous communication system, from the base station, and attempting the handover to the heterogeneous communication system using the channel allocation information.

According to another aspect of the present invention, an operating method of a base station for a handover between a broadband wireless communication system and a heterogeneous communication system is provided. The method of the base station includes when a terminal attempts a handover to a dummy cell or when an active set includes only a border cell because of the handover of the terminal, requesting the handover to a corresponding heterogeneous communication system, receiving a message, including channel allocation information for the handover, from the corresponding heterogeneous communication system, and forwarding the message, including the channel allocation information, to the terminal.

According to yet another aspect of the present invention, an operating method of a terminal for a handover between a broadband wireless communication system and a heterogeneous communication system is provided. The method of the terminal includes when a signal level of a downlink falls below a preset handover threshold, requesting a handover to a base station, after requesting the handover, receiving a message, including channel allocation information for a handover to a heterogeneous communication system, from the base station, and attempting the handover to the heterogeneous communication system using the channel allocation information.

According to still another aspect of the present invention, a base station for a handover between a broadband wireless communication system and a heterogeneous communication system is provided. The base station includes a controller for sending to a terminal a message requesting a measurement of a signal level of a downlink, when the terminal enters a border cell, a handover processor for requesting a handover to a corresponding heterogeneous communication system, when a signal level measured by the terminal falls below a preset threshold, an interface for receiving a message, including channel allocation information for the handover, from the corresponding heterogeneous communication system, and a message generator for generating a message including the channel allocation information.

According to a further aspect of the present invention, a terminal for a handover between a broadband wireless communication system and a heterogeneous communication system is provided. The terminal includes a controller for receiving a message requesting a measurement of a signal level of a downlink from a base station and for sending a message reporting of the signal level of the downlink to the base station, and a handover controller for receiving, a message including channel allocation information for a handover to a heterogeneous communication system, from the base station and for attempting the handover to the heterogeneous communication system using the channel allocation information.

According to a further aspect of the present invention, another base station for a handover between a broadband wireless communication system and a heterogeneous communication system is provided. The another base station includes a handover processor for requesting a handover to a corresponding heterogeneous communication system, when a terminal attempts the handover to a dummy cell or when an active set includes only a border cell because of the handover of the terminal, and a controller for receiving a message including channel allocation information for the handover from the corresponding heterogeneous communication system and for forwarding the message including the channel allocation information to the terminal.

According to a further aspect of the present invention, another terminal for a handover between a broadband wireless communication system and a heterogeneous communication system is provided. The another terminal includes a controller for requesting a handover to a base station, when a signal level of a downlink falls below a preset handover threshold, and a handover controller for, after requesting the handover, receiving a message, including channel allocation information for a handover to a heterogeneous communication system, from the base station and for attempting the handover to the heterogeneous communication system using the channel allocation information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for handover to a heterogeneous communication system from a broadband wireless communication system. Hereafter, several conditions are assumed for the understanding of the exemplary embodiments of the present invention. First, a cell of the broadband wireless communication system supports a Fast Base Station BS Switching (FBSS). Secondly, a terminal is a dual-mode dual-band terminal which supports a modem for the broadband wireless communication system and a modem for the heterogeneous communication system (e.g., EV-DO and WCDMA/HSDPA). Thirdly, a service coverage area of the heterogeneous communication system is larger than a service coverage area of the broadband wireless communication system. Fourthly, terminal information and channel allocation messages can be transmitted between the broadband wireless communication system and the heterogeneous communication system over a core network. Fifthly, the terminal is not aware of a border cell. Sixthly, since interference from the border cell of the broadband wireless communication system to the heterogeneous network is much less than that of an overlay network, relatively good Carrier to Interference and Noise Ratio (CINR) is presented even with a low Received Signal Strength Indication (RSSI).

Figure 1:
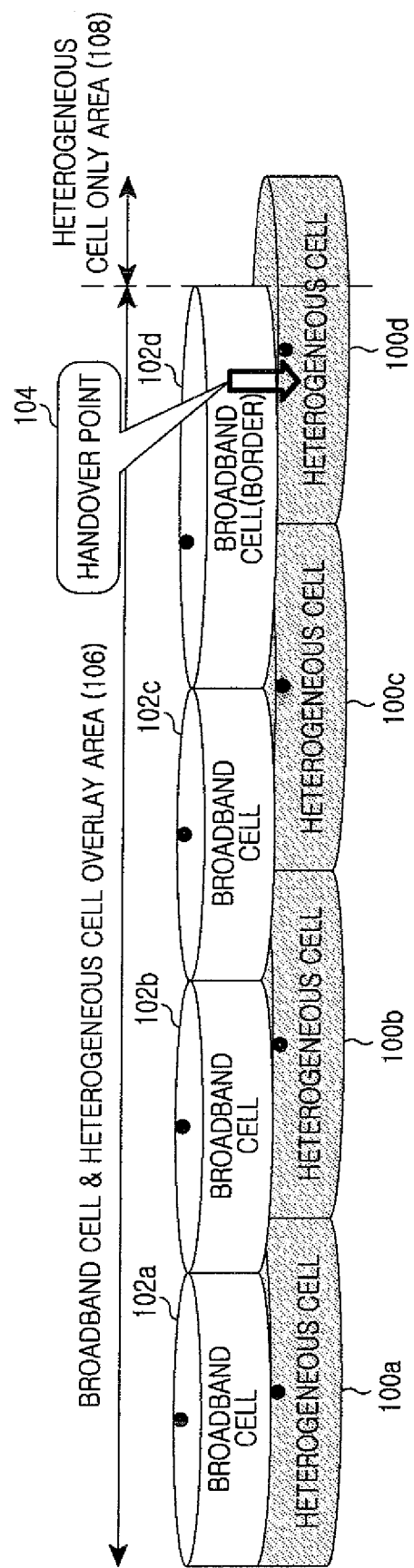
FIG. 1 is a diagram of a handover between a heterogeneous communication system and a broadband wireless communication system, according to an exemplary embodiment of the present invention.
Figure 2:
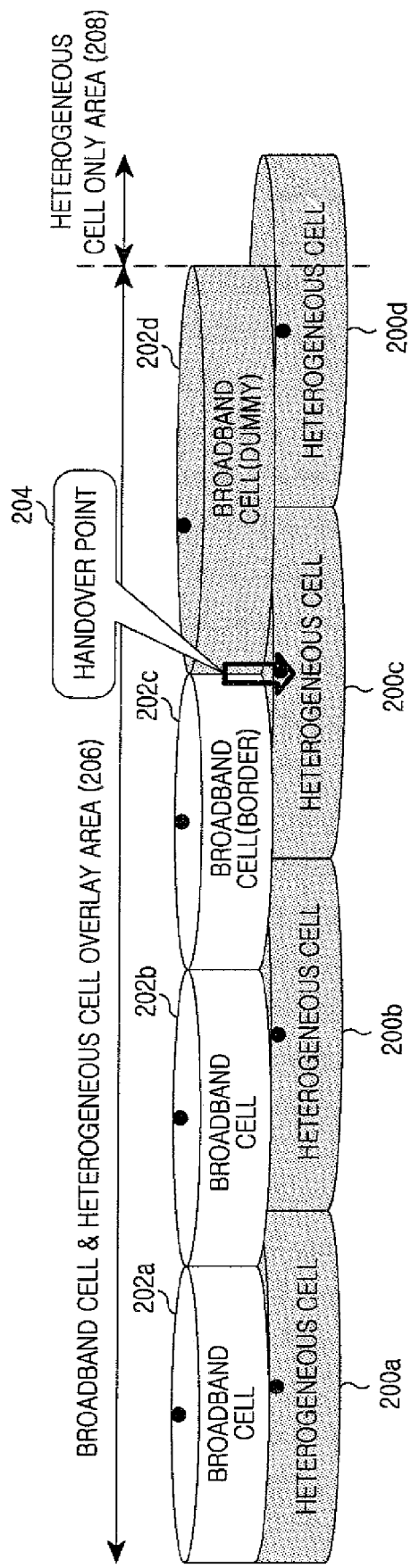
FIG. 2 is a diagram of a handover between a heterogeneous communication system and a broadband wireless communication system, according to another exemplary embodiment of the present invention.
Figure 3:
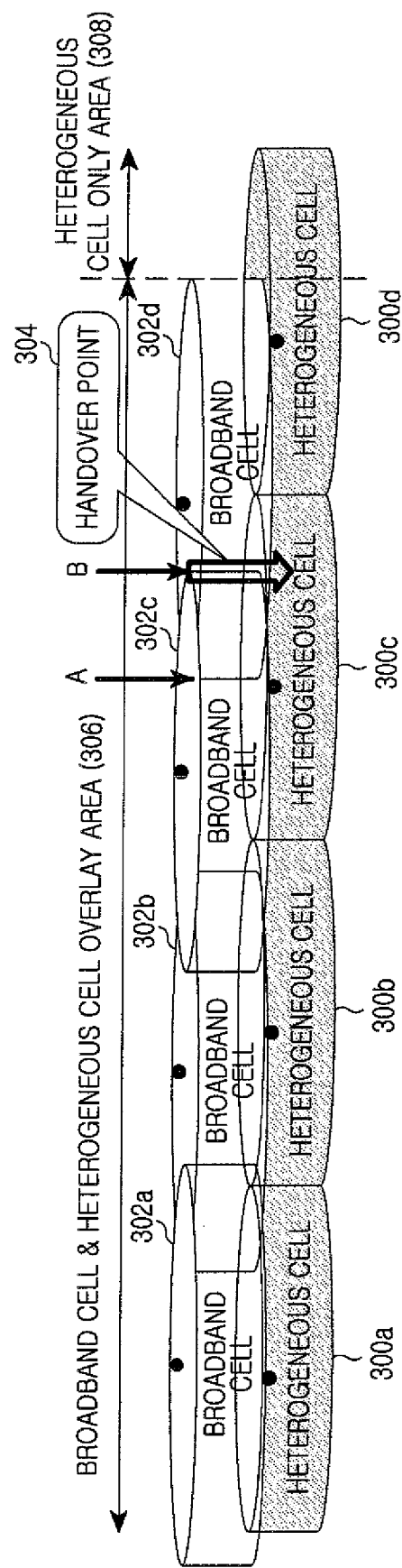
FIG. 3 is a diagram of a handover between a heterogeneous communication system and a broadband wireless communication system, according to yet another exemplary embodiment of the present invention.
Figure 4:
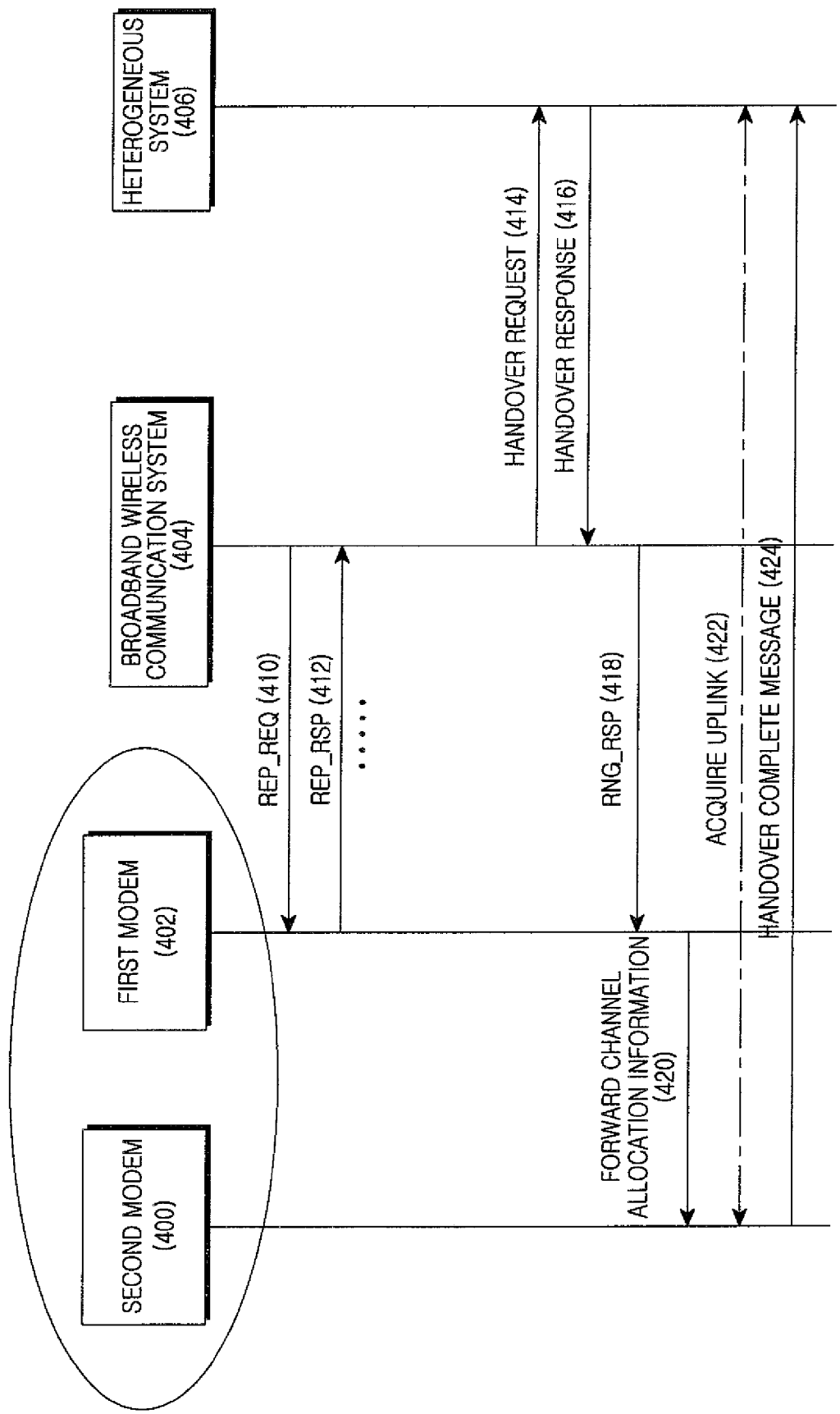
FIG. 4 is a signal flow diagram of a handover between a heterogeneous communication system and a broadband wireless communication system, according to an exemplary embodiment of the present invention.
Figure 5:
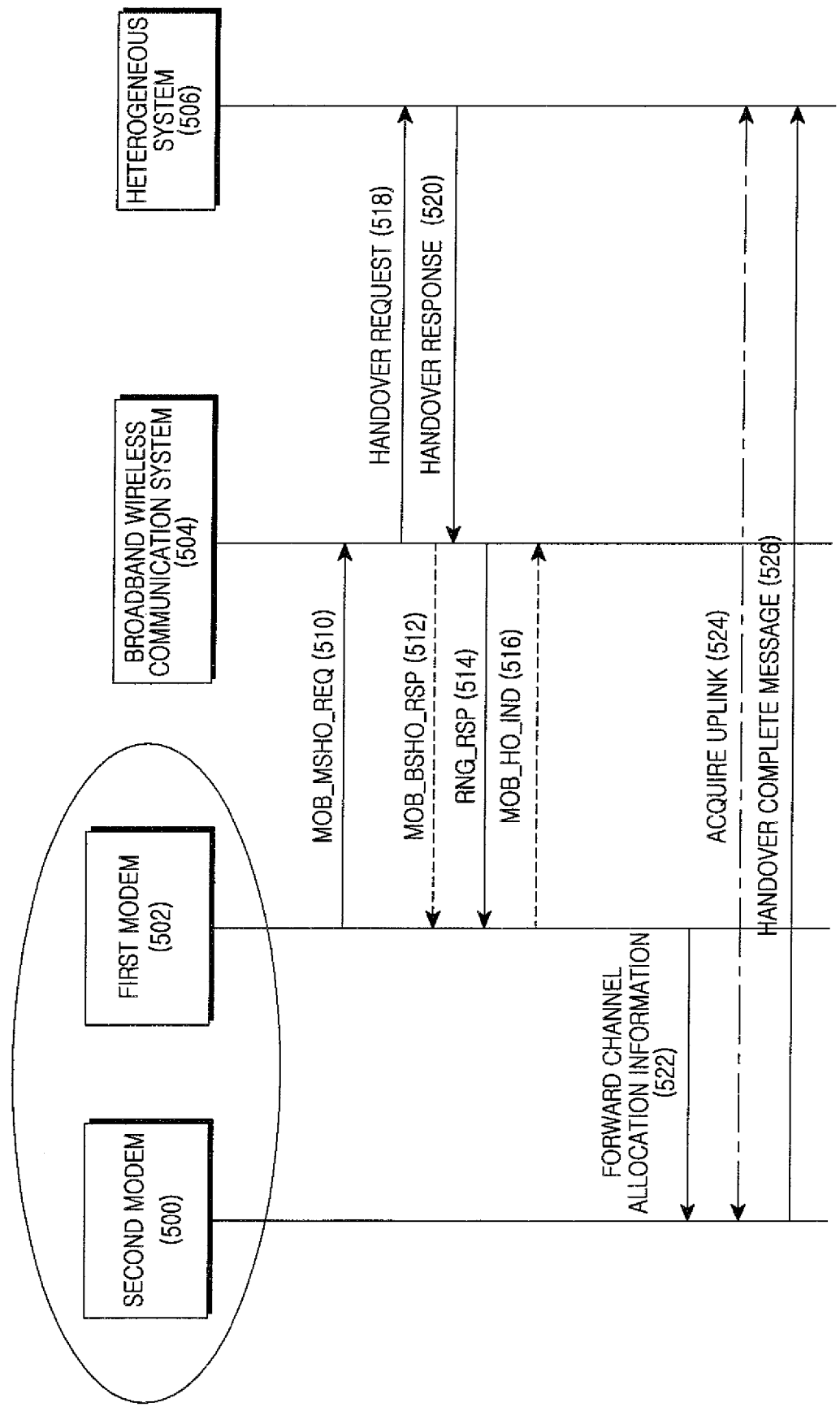
FIG. 5 is a signal flow diagram of a handover between a heterogeneous communication system and a broadband wireless communication system, according to another exemplary embodiment of the present invention.
Figure 6:
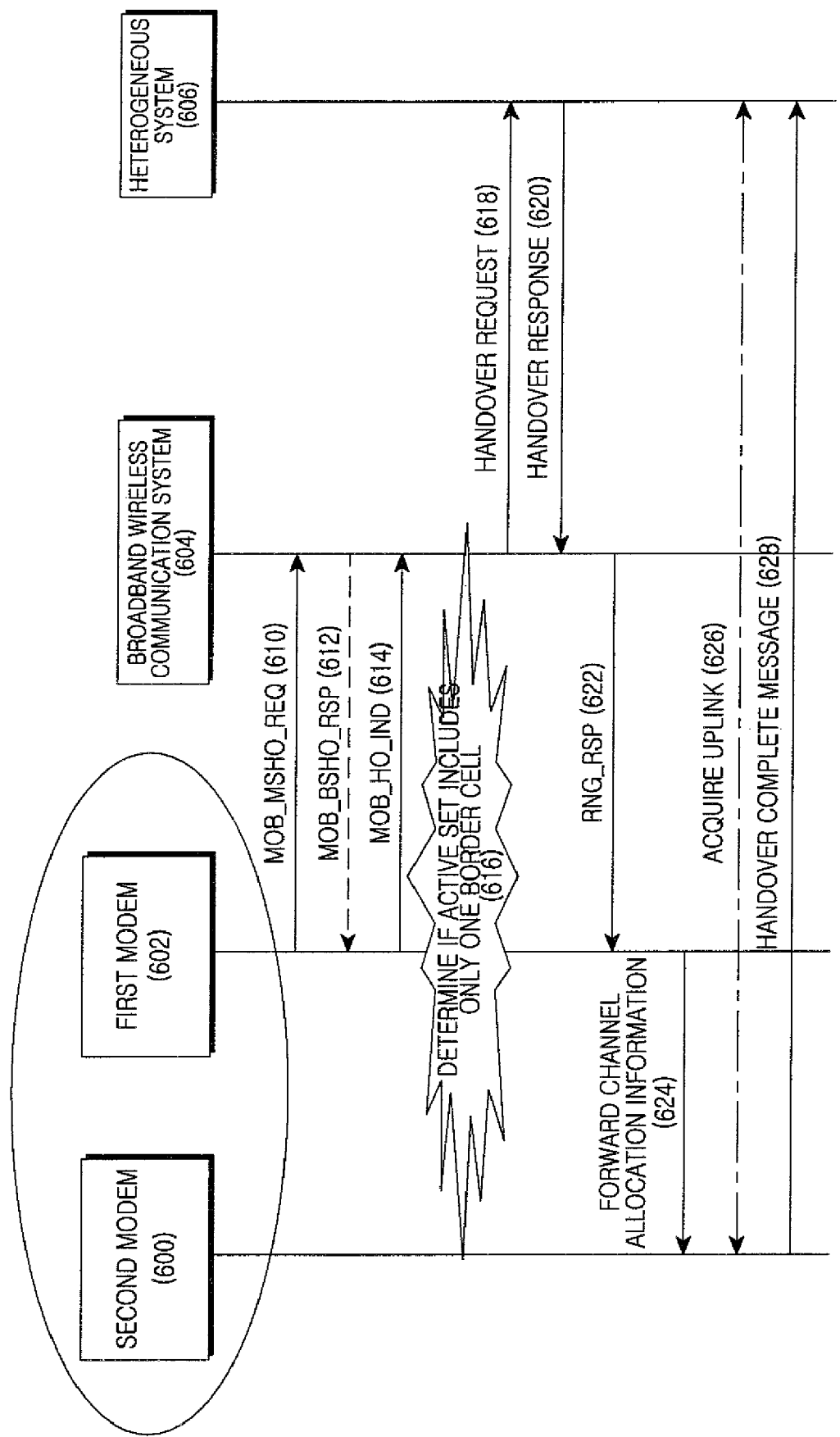
FIG. 6 is a signal flow diagram of a handover between a heterogeneous communication system and a broadband wireless communication system, according to yet another exemplary embodiment of the present invention.

FIGS. 1, 2 and 3 are diagrams of handover between a heterogeneous communication system and a broadband wireless communication system, according to exemplary embodiments of the present invention. FIGS. 4, 5 and 6 illustrate three exemplary embodiments of the present invention in detail.

FIG. 1 is a diagram of a handover between a heterogeneous communication system and a broadband wireless communication system, according to an exemplary embodiment of the present invention.

Broadband cells 102a, 102b, 102c and 102d of the broadband wireless communication system define a service coverage area of the broadband wireless communication system. Broadband cell 102d is a border cell of the broadband wireless communication system. As a border cell, broadband cell 102d is positioned on the border of the cells of the service coverage area of the broadband wireless communication system. Heterogeneous cells 100a, 100b, 100c and 100d of the heterogeneous communication system define a service coverage area of the heterogeneous communication system. The service coverage area of the heterogeneous communication system is larger than that of the broadband wireless communication system. The service coverage area is divided to an overlay area 106 overlapped by the service coverage area of the broadband wireless communication system and the service coverage area of the heterogeneous communication system, and a heterogeneous cell only area 108. Herein, if a dual-mode dual-band terminal, serviced in border cell 102d of the broadband wireless communication system, enters the heterogeneous cell only area 108, the terminal will not receive service unless handover is performed between the broadband wireless communication system and the heterogeneous communication system.

According to an exemplary embodiment of the present invention, to avoid the out-of-service scenario described above, when the terminal enters the border cell 102d of the broadband wireless communication system, the terminal periodically measures a signal level of a downlink and sends the measured signal level to its base station, which is a base station in charge of the border cell. Under the control of the base station, when the signal level of the border cell 102d falls below a certain level, the terminal receives channel allocation information from an upper network entity and attempts the handover 104 to the heterogeneous cell 100d, which will be described in more detail below by referring to FIG. 4.

FIG. 2 is a diagram of a handover between a heterogeneous communication system and a broadband wireless communication system, according to another exemplary embodiment of the present invention.

Referring to FIG. 2, broadband cells 202a, 202b, 202c and 202d of the broadband wireless communication system define a service coverage area of the broadband wireless communication system. Heterogeneous cells 200a, 200b, 200c and 200d of the heterogeneous communication system define a service coverage area of the heterogeneous communication system. The service coverage area of the heterogeneous communication system is larger than that of the broadband wireless communication system. The service coverage area is divided to an overlay area 206 overlapped by the service coverage area of the broadband wireless communication system and the service coverage area of the heterogeneous communication system, and a heterogeneous cell only area 208. Broadband cell 202c is a border cell of the broadband wireless communication system and Broadband cell 202d is a dummy cell of the broadband wireless communication system.

FIG. 2 depicts the handover when a dummy cell 202d is present next to a border cell 202c in the broadband wireless communication system. Herein, the dummy cell 202d extends the service coverage area to a virtual service coverage area. When a terminal serviced by the broadband wireless communication system enters the border cell 202c and needs to handover to the dummy cell 202d, the terminal attempts the handover 204 to the heterogeneous cell 200c under the control of a network entity, which will be explained in more detail below by referring to FIG. 5.

FIG. 3 is a diagram of a handover between a heterogeneous communication system and a broadband wireless communication system, according to yet another exemplary embodiment of the present invention.

Referring to FIG. 3, broadband cells 302a, 302b, 302c and 302d of the broadband wireless communication system define a service coverage area of the broadband wireless communication system. Heterogeneous cells 300a, 300b, 300c and 300d of the heterogeneous communication system define a service coverage area of the heterogeneous communication system. The service coverage area of the heterogeneous communication system is larger than that of the broadband wireless communication system. The service coverage area is divided to an overlay area 306 overlapped by the service coverage area of the broadband wireless communication system and the service coverage area of the heterogeneous communication system, and a heterogeneous cell only area 308. Broadband cell 302d is a border cell of the broadband wireless communication system.

When a terminal serviced by the broadband wireless communication system enters border cell 302d at point A, it can acquire a plurality of active set information that is updated for the handover. Herein, the active set is a set of base stations currently in communications. There may be several base stations in the set according to the handover. When the terminal moves to a heterogeneous cell only area 308, the active set includes only the base station of the border cell 302d. When the active set includes only the base station of the border cell 302d, the terminal attempts the handover 304 to heterogeneous cell 300d at point B, which will be explained in more detail below by referring to FIG. 6.

In FIGS. 4, 5 and 6, the terminal, which includes a first modem and a second modem, can access to both the broadband wireless communication system and the heterogeneous communication system. The modem for the broadband wireless communication system is referred to as a first modem and the modem for the heterogeneous communication system is referred to as a second modem. It is assumed that the terminal operates using the first modem in the overlay areas 106, 206 and 306 overlapped by the service coverage areas of the broadband wireless communication system and the heterogeneous communication system, and that the second modem can transition from a low power mode into an active mode when the first modem is interrupted.

FIG. 4 is a signal flow diagram of the handover between a heterogeneous communication system and a broadband wireless communication system, according to an exemplary embodiment of the present invention. FIG. 4 is described below with reference to FIG. 1 which was described above.

When a terminal enters border cell 102d, a base station in the broadband wireless communication system 404 periodically sends a message Report_Request (REP_REQ) requesting a Received Signal Strength Indication (RSSI) of the downlink to the first modem 402 of terminal in step 410.

In step 412, the first modem 402 of terminal sends a response message Report_ReSPonse (REP_RSP) including the measured RSSI to the base station in the broadband wireless communication system 404.

When the RSSI measured by the terminal falls below a threshold, the base station in the broadband wireless communication system 404 requests handover to the heterogeneous communication system 406 over a core network (N/W) in step 414. Herein, when the threshold is too high, the terminal, which enters the border cell and immediately attempts the handover to the heterogeneous communication system, may waste the border cell area. By contrast, when the threshold is too low, call drop is likely to occur because the handover is carried out far away from the base station.

In step 416, the heterogeneous communication system 406 allocates a channel to a target heterogeneous cell 100d to which the terminal moves, in response to the handover request and sends a message including the allocated channel information to the base station of broadband wireless communication system 404 over the core N/W. For example, the channel allocation message of the heterogeneous communication system may be a Universal Handoff Direction Message (UHDM) in CDMA 1x, a Traffic Channel Assignment (TCA) message in the EV-DO, or an Active Set Update (ASU) message in the WCDMA.

In step 418, the base station of broadband wireless communication system 404 forwards the channel allocation information received from the heterogeneous communication system 406 to the first modem 402 in the terminal using an RNG_RSP message. The channel allocation information may be TLV-coded and added to TLV encoded information of the RNG_RSP message. Table 1 shows the RNG_RSP message format and Table 2 shows channel allocation information parameters of the heterogeneous communication system, which are added to the RNG_RSP message.

TABLE 1

| Syntax | Size | Notes |
| --- | --- | --- |
| RNG_RSP_Message_Format( ) { | | |
| Management Message Type = 5 | 8 bits | |
| reserved | 8 bits | Shall be set to zero |
| TLV Encoded Information | variable | TLV specific |
| } | | |

TABLE 2

| Name | Type (1 byte) | Length | Value (variable-length) |
| --- | --- | --- | --- |
| . . . existing parameters defined . . . | | | |
| Heterogeneous message encoding | 34 | variable | message contents of heterogeneous communication system |

Next, the first modem 402 of the terminal provides the received channel allocation information to the second modem 400 to access to the heterogeneous communication system in step 420.

The terminal operating using the second modem 400 acquires an uplink of the heterogeneous communication system 406 using the channel allocation information through the second modem in step 422, and transmits a handover complete report message to the heterogeneous communication system 406 in step 424. Herein, the handover complete report message of the heterogeneous communication system may be a Handoff Complete Message (HCM) in the CDMA 1x, a Traffic Channel Complete (TCC) message in the EV-DO, or an Active Set Update Complete (ASUC) message in the WCDMA.

Next, the handover between the broadband wireless communication system and the heterogeneous communication system is finished.

FIG. 5 is a signal flow diagram of the handover between the heterogeneous communication system and the broadband wireless communication system, according to another exemplary embodiment of the present invention. FIG. 5 is described below with reference to FIG. 2 which was described above.

When the RSSI falls below a handover threshold and the handover to the dummy cell 202c is needed, a first modem 502 in a terminal in the border cell 202c of the broadband wireless communication system sends a handover request message MOB_MSHO_REQ to a base station of the broadband wireless communication system 504 in step 510.

When the handover requested by the first modem 502 of the terminal is a request for handover to the dummy cell, the base station of the broadband wireless communication system 504 requests handover to the heterogeneous communication system 506 in step 518. In response, the base station of the broadband wireless communication system 504 sends a handover response message MOB_BSHO_RSP to the first modem 502 in the terminal in step 512.

In step 520, the heterogeneous communication system 506 allocates a channel to a target cell heterogeneous 200d in response to the handover request and sends a message including the allocated channel information to the base station of the broadband wireless communication system 504 over a core N/W.

In step 514, the base station 504 forwards the channel allocation information received from the heterogeneous communication system 506 to the first modem 502 of the terminal using an RNG_RSP message. The RNG_RSP message format is shown in Table 1 and Table 2.

In step 522, to access the heterogeneous communication system, the first modem 502 of the terminal provides the received channel allocation information to the second modem 500 of the terminal.

The terminal operating using the second modem 500 acquires an uplink of the heterogeneous communication system 506, using the channel allocation information, through the second modem 500 in step 524, and sends a handover complete report message to the heterogeneous communication system 506 in step 526.

Next, the handover between the broadband wireless communication system and the heterogeneous communication system is finished.

FIG. 6 is a signal flow diagram of the handover between the heterogeneous communication system and the broadband wireless communication system, according to yet another exemplary embodiment of the present invention. FIG. 6 is described below with reference to FIG. 3 which was described above.

When the RSSI falls below a preset handover threshold, a first modem 602 in a terminal sends a handover request message to a base station of a broadband wireless communication system 604 in step 610.

The base station of the broadband wireless communication system 604 sends a handover response message to the first modem 602 of the terminal in step 612 and receives a message MOB_HO_IND informing of the handover in step 614. Also, the base station of the broadband wireless communication system 604 determines whether the active set includes only a border cell. When the active set includes only the border cell in step 616, the base station of the broadband wireless communication system 604 sends a handover request message to the heterogeneous communication system 606 in step 618 and receives a channel allocation information message in step 620. Herein, the active set is a set of currently connectable base stations. There may be multiple base stations, according to the handover. Since the active set changes according to the movement of the terminal, the base station can determine based on the active set information whether the terminal needs to handover to the heterogeneous communication system.

In step 622, the base station of the broadband wireless communication system 604 forwards the channel allocation information received from the heterogeneous communication system 606 to the first modem 602 of the terminal using an RNG_RSP message. The RNG_RSP message format is shown in Table 1 and Table 2.

In step 624, the first modem 602 of the terminal provides the received channel allocation information to the second modem 600 of the terminal to access to the heterogeneous communication system.

The terminal operating using the second modem 600 acquires an uplink of the heterogeneous communication system 606, using the channel allocation information, through the second modem 600 in step 626 and sends a handover complete report message to the heterogeneous communication system 606 in step 628.

Next, the handover between the broadband wireless communication system and the heterogeneous communication system is finished.

Figure 7:
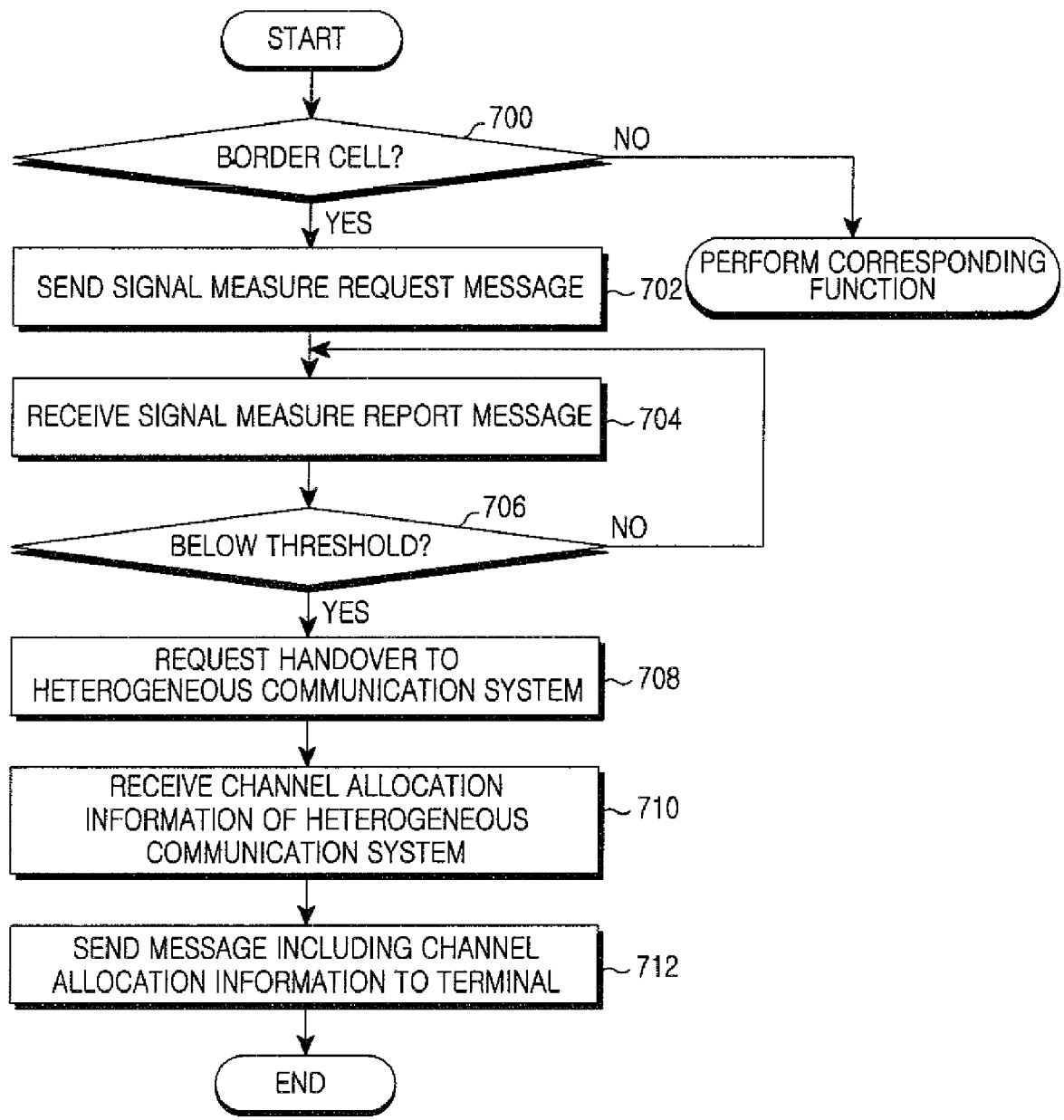
FIG. 7 is a flowchart of operations of a base station for a handover between a heterogeneous communication system and a broadband wireless communication system, according to an exemplary embodiment of the present invention.

FIG. 7 is a flowchart of operations of a base station for the handover between the heterogeneous communication system and the broadband wireless communication system, according to an exemplary embodiment of the present invention.

In step 700, the base station determines whether the terminal is present in the border cell. When the terminal is in the border cell, the base station sends a downlink RSSI measure request message to the terminal in step 702. When the terminal is not in the border cell, the base station performs a corresponding function.

In step 704, the base station receives a downlink RSSI report message from the terminal as requested.

When the RSSI reported by the terminal falls below the threshold in step 706, the base station requests the handover to the heterogeneous communication system in step 708.

In step 710, the base station receives information relating to a channel allocated by the heterogeneous communication system to a corresponding cell. The corresponding cell is a cell to which the terminal is handed over.

In step 712, the base station sends a message RNG_RSP including the received channel allocation information to the terminal.

Next, the base station finishes the process.

Figure 8:
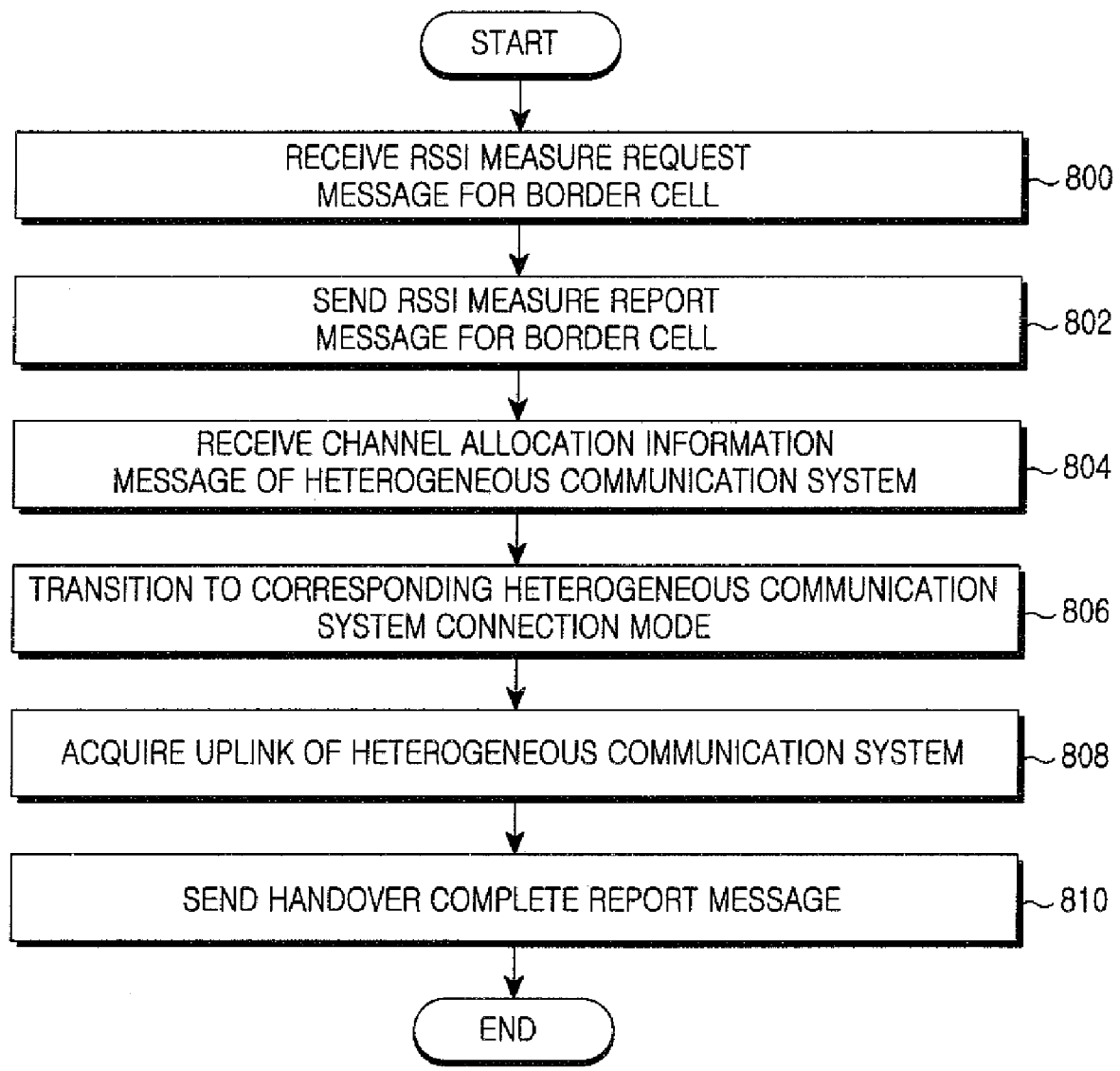
FIG. 8 is a flowchart of operations of a terminal for a handover between a heterogeneous communication system and a broadband wireless communication system, according to an exemplary embodiment of the present invention.

FIG. 8 is a flowchart of operations of the terminal for the handover between the heterogeneous communication system and the broadband wireless communication system, according to an exemplary embodiment of the present invention.

In step 800, the terminal receives the downlink RSSI measure request message for the border cell from the base station.

In step 802, the terminal measures the downlink RSSI for the border cell and periodically reports the measured RSSI to the base station.

In step 804, the terminal receives the message including the channel allocation information of the heterogeneous communication system from the base station.

In step 806, the terminal transitions to the heterogeneous communication system connection mode. For example, the terminal interrupts the first modem in use and activates the second modem to connect to the heterogeneous communication system.

In step 808, the terminal acquires the uplink of the heterogeneous communication system using the channel allocation information.

In step 810, the terminal sends the handover complete report message to the heterogeneous communication system.

Next, the terminal finishes this process.

Figure 9:
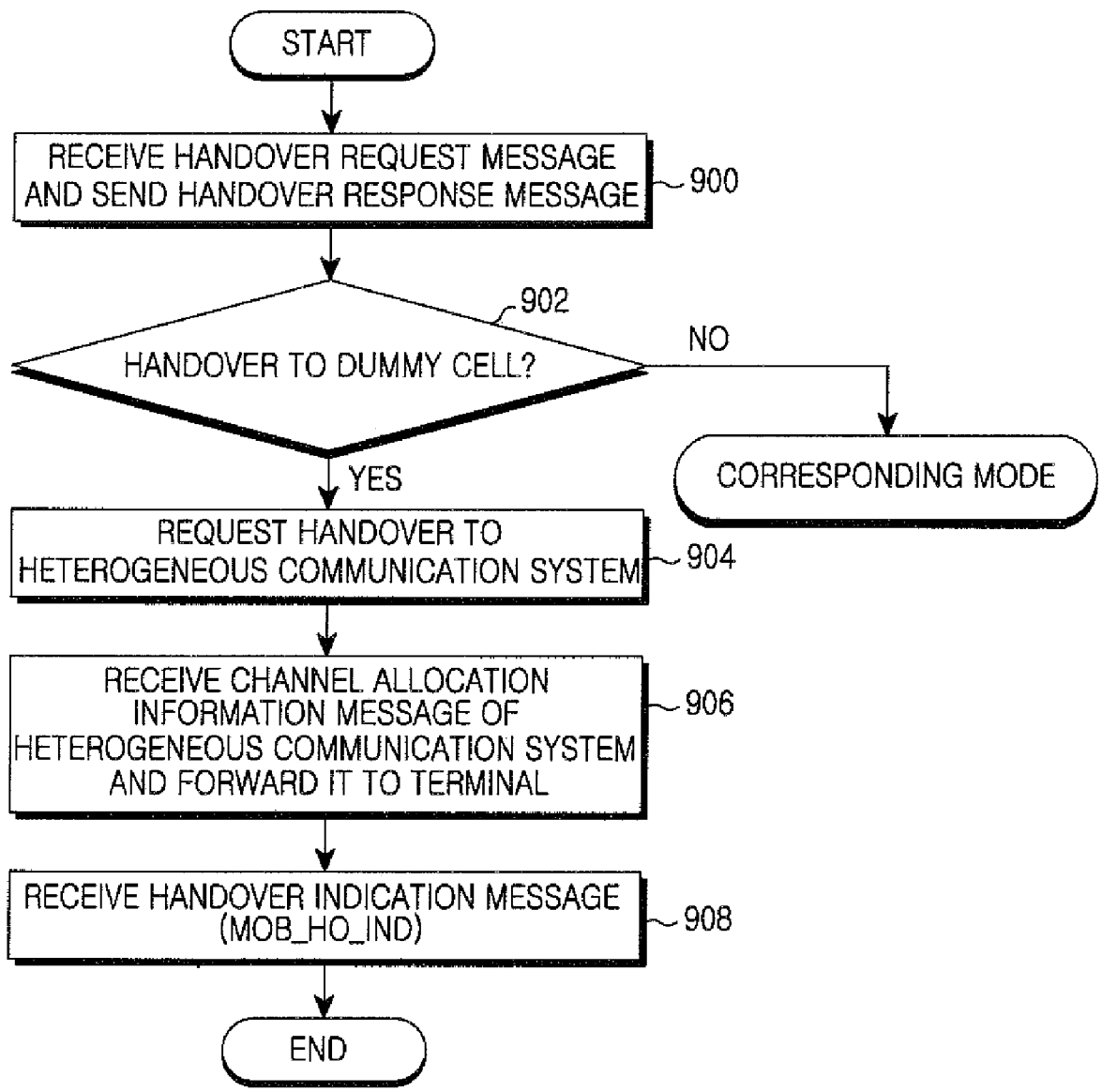
FIG. 9 is a flowchart of operations of a base station for a handover between a heterogeneous communication system and a broadband wireless communication system, according to another exemplary embodiment of the present invention.

FIG. 9 is a flowchart of operations of the base station for the handover between the heterogeneous communication system and the broadband wireless communication system, according to another exemplary embodiment of the present invention.

In step 900, the base station receives the handover request message MOB_MSHO_REQ from the terminal and sends the handover response message MOB_BSHO_RSP.

Next, the base station determines whether the handover requested by the terminal is the request to handover to the dummy cell. In case of the request to handover to the dummy cell, the base station requests the handover to the heterogeneous communication system in step 904. When the request to handover is not to the dummy cell, the base station operates in the corresponding mode.

In step 906, the base station receives the channel allocation information message from the heterogeneous communication system and forwards the message RNG_RSP including the received channel allocation information to the terminal.

In step 908, the base station receives the message MOB_HO_IND informing of the handover from the terminal.

Next, the base station finishes this process.

Figure 10:
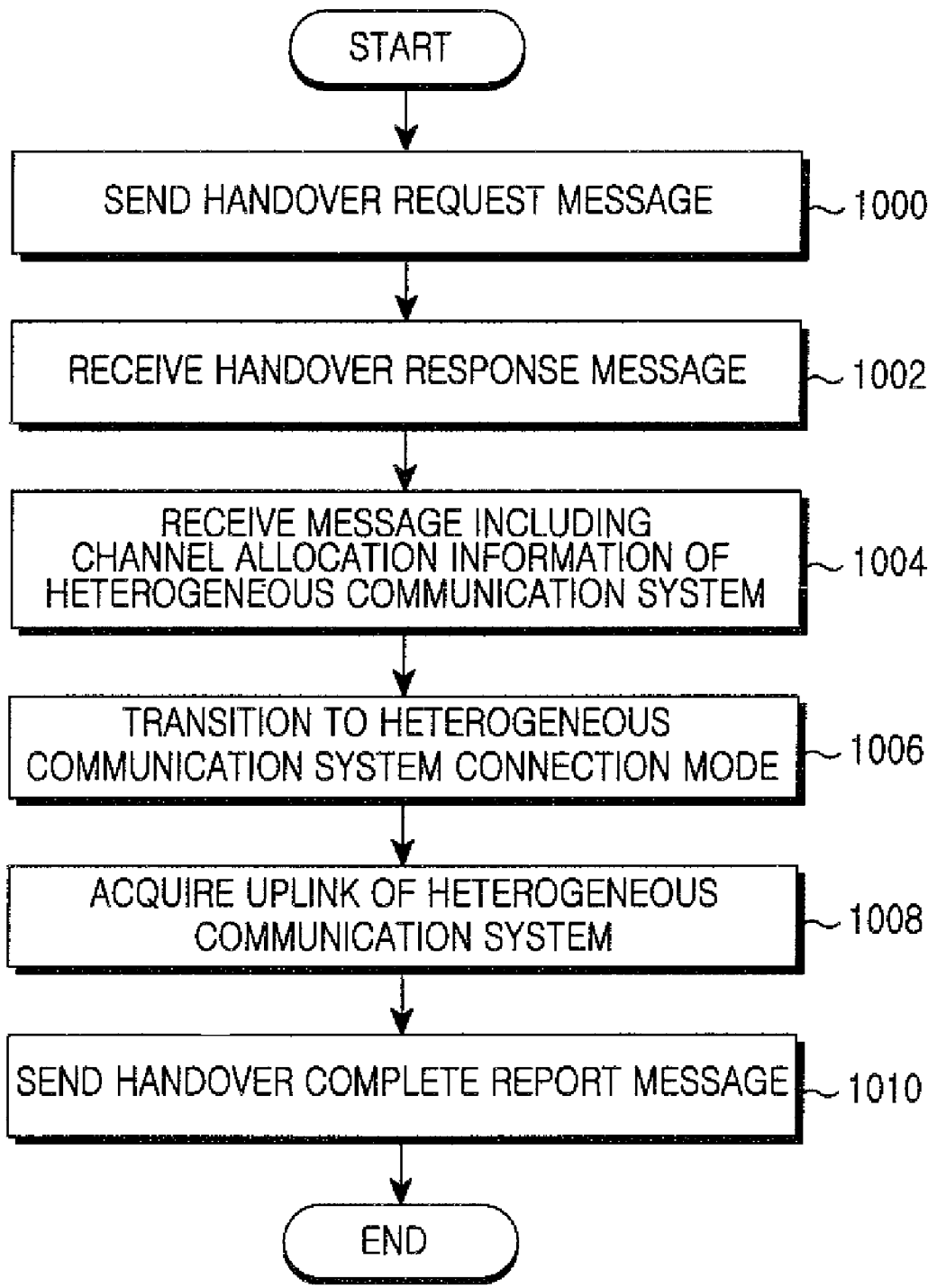
FIG. 10 is a flowchart of operations of a terminal for a handover between a heterogeneous communication system and a broadband wireless communication system, according to another exemplary embodiment of the present invention.

FIG. 10 is a flowchart of operations of the terminal for the handover between the heterogeneous communication system and the broadband wireless communication system, according to another exemplary embodiment of the present invention.

In step 1000, when the RSSI falls below the preset handover threshold, the terminal sends the handover request message to the base station.

In step 1002, the terminal receives the handover response message from the base station.

Upon receiving the message RNG_RSP including the channel allocation information of the heterogeneous communication system in step 1004, the terminal sends the message MOB_HO_IND informing of the handover to the base station and transitions to the heterogeneous communication system connection mode in step 1006. For example, the terminal interrupts the first modem in use and activates the second modem to connect to the heterogeneous communication system.

In step 1008, the terminal acquires the uplink of the heterogeneous communication system using the channel allocation information.

In step 1010, the terminal sends the handover complete report message to the heterogeneous communication system.

Next, the terminal finishes this process.

Figure 11:
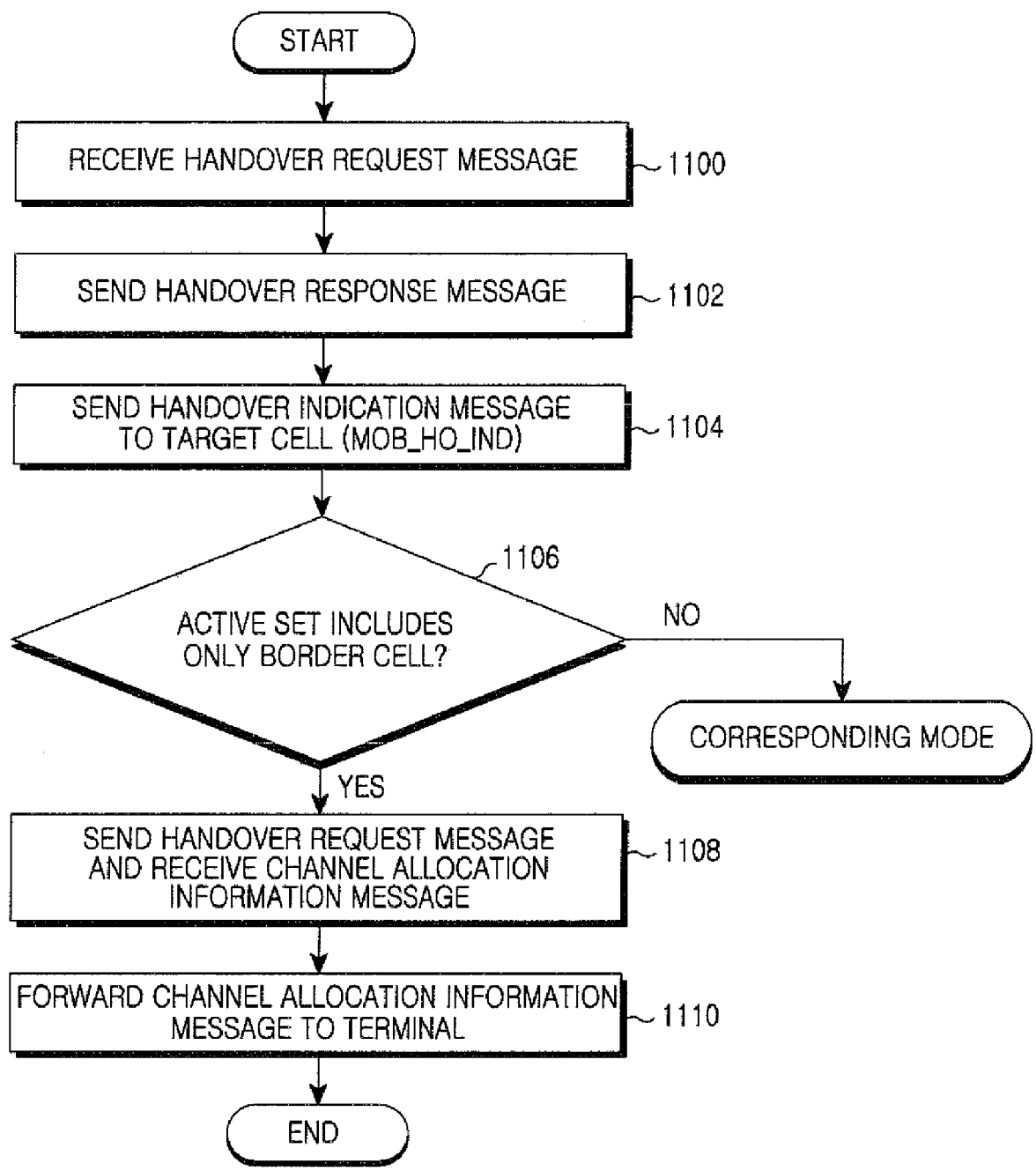
FIG. 11 is a flowchart of operations of a base station for a handover between a heterogeneous communication system and a broadband wireless communication system, according to yet another exemplary embodiment of the present invention.

FIG. 11 is a flowchart of operations of the base station for the handover between the heterogeneous communication system and the broadband wireless communication system, according to yet another exemplary embodiment of the present invention.

In step 1100, the base station receives the handover request message from the terminal.

In step 1102, the base station sends the handover response message to the terminal.

In step 1104, the base station sends the message MOB_HO_IND informing of the handover to target cell.

In step 1106, the base station determines whether the active set includes only the border cell. When the active set includes only the border cell, the base station sends the handover request message to the heterogeneous communication system and then receives the channel allocation information message in step 1108. When the active set does not only include the border cell, the base station operates in the corresponding mode.

In step 1110, the base station forwards the message RNG_RSP including the received channel allocation information to the terminal.

Next, the base station finishes this process.

Figure 12:
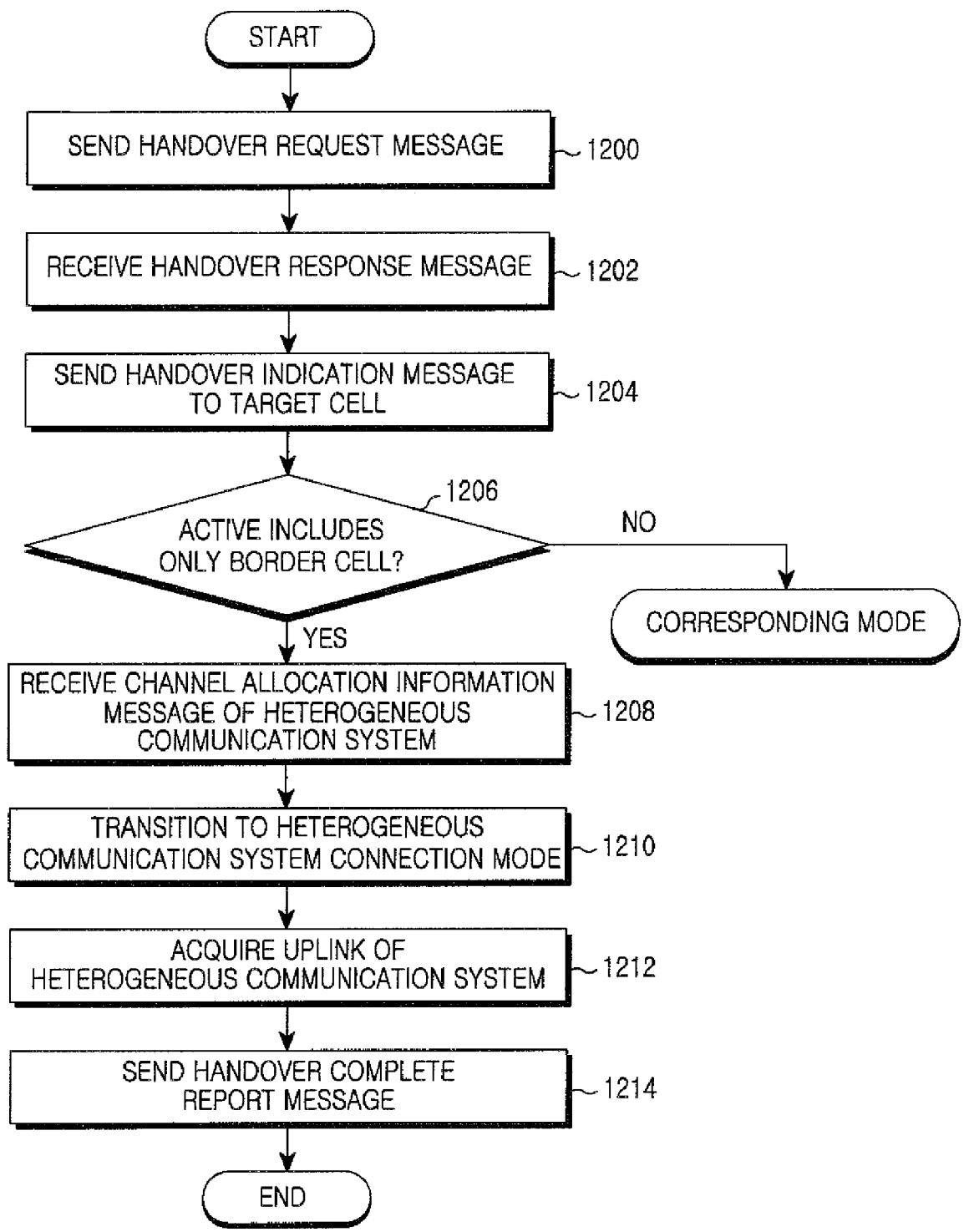
FIG. 12 is a flowchart of operations of a terminal for a handover between a heterogeneous communication system and a broadband wireless communication system, according to yet another exemplary embodiment of the present invention.

FIG. 12 is a flowchart of operations of the terminal for the handover between the heterogeneous communication system and the broadband wireless communication system, according to yet another exemplary embodiment of the present invention.

In step 1200, the terminal sends the handover request message to the base station when the RSSI falls below the preset handover threshold.

In step 1202, the terminal receives the handover response message from the base station.

In step 1204, the terminal sends the message MOB_HO_IND informing of the handover to the target cell.

When the active set includes only the border cell in step 1206, the terminal receives the channel allocation information message of the heterogeneous communication system from the base station in step 1208. When the active set does not only include the border cell, the terminal operates in the corresponding mode.

In step 1210, the terminal transitions to the heterogeneous communication system connection mode. For instance, the terminal interrupts the first modem and activates the second modem to connect to the heterogeneous communication system.

In step 1212, the terminal acquires the uplink of the heterogeneous communication system using the channel allocation information.

In step 1214, the terminal sends the handover complete report message to the heterogeneous communication system.

Next, the terminal finishes this process.

Figure 13:
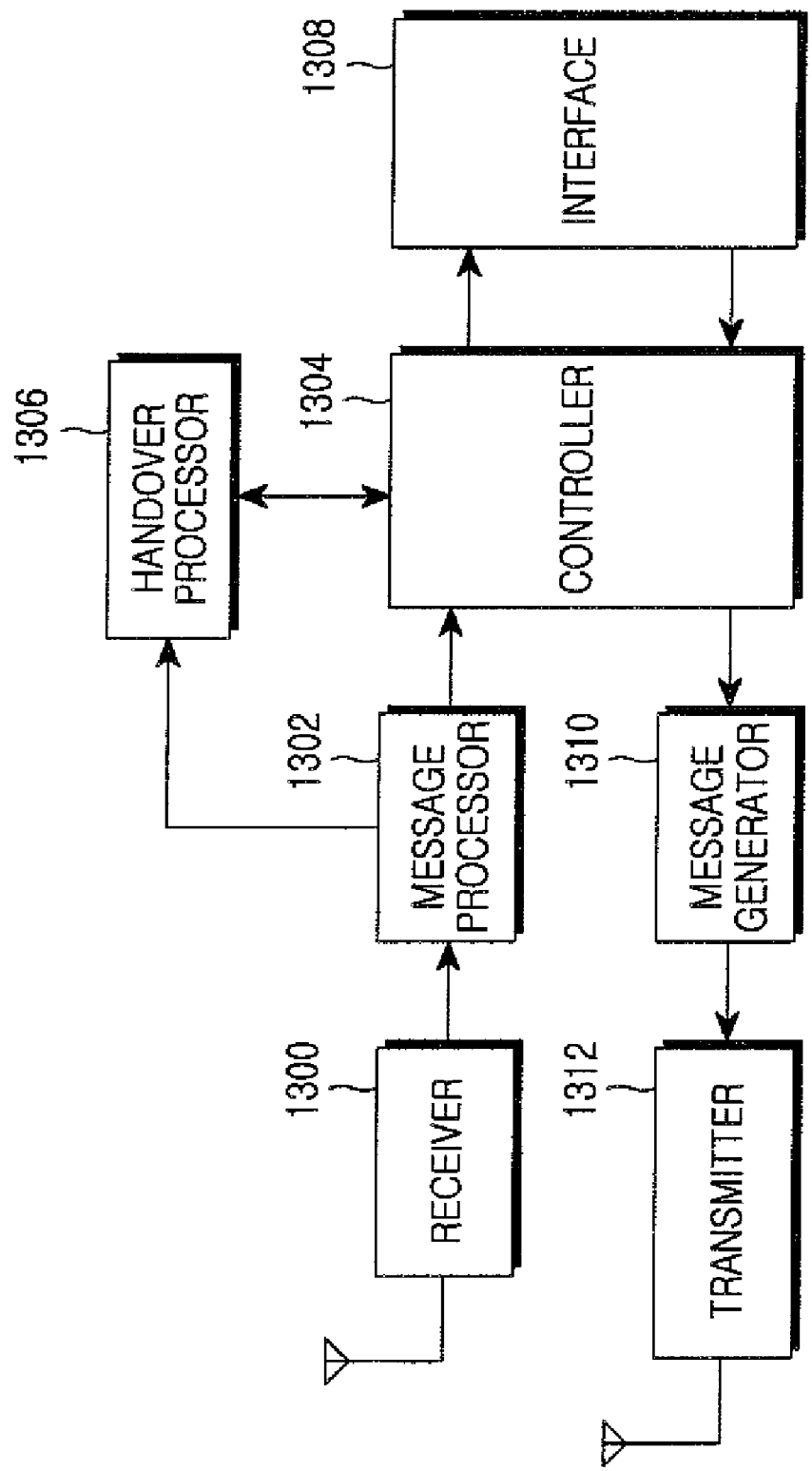
FIG. 13 is a block diagram of the base station of FIG. 9 for the handover between the heterogeneous communication system and the broadband wireless communication system, according to an exemplary embodiment of the present invention.

FIG. 13 is a block diagram of the base station for the handover between the heterogeneous communication system and the broadband wireless communication system, according to an exemplary embodiment of the present invention.

The base station of FIG. 13 includes a receiver 1300, a message processor 1302, a controller 1304, a handover processor 1306, an interface 1308, a message generator 1310, and a transmitter 1312. The receiver 1300 and the transmitter 1312 may be an OFDM receiver and the transmitter may be an OFDM transmitter.

The receiver 1300 receives a Radio Frequency (RF) signal from the terminal, demodulates and decodes the RF signal, and outputs the decoded data to the message processor 1302.

The message processor 1302 decomposes a control message input from the receiver 1300 and provides the result to the controller 1304 and the handover processor 1306. For example, the message processor 1302 processes the handover request message or the handover indication message from the terminal in relation with the handover, provides the processed message to the handover processor 1306, and provides the other control messages to the controller 1302.

The controller 1304 processes the information output from the message processor 1302 and provides the processed result to the message generator 1310. The controller 1304 requests the handover to the heterogeneous communication system through the interface 1308 by referring to the handover information from the handover processor 1306 or receives the channel allocation information from the heterogeneous communication system. Herein, the channel allocation information is channel information relating to the cell, to which the terminal moves, of the heterogeneous communication system.

Receiving the handover related information from the message processor 1302 and determining the terminal to be in the border, the heterogeneous network handover processor 1306 requests the terminal to report of the RSSI of the downlink. When the RSSI falls below the threshold, the handover processor 1306 requests the handover to the heterogeneous communication system through the interface 1308. When the terminal is handed over to the dummy cell, the handover processor 1306 requests the handover to the heterogeneous communication system through the interface 1308. When the active set of the terminal includes only the border cell, the handover processor 1306 requests the handover to the heterogeneous communication system through the interface 1308.

The message generator 1310 generates a message with the various information provided from the controller 1304 and outputs the generated message to the transmitter 1312. According to an exemplary embodiment of the present invention, the message generator 1310 receives the channel allocation information from the controller 1304 and generates the RNG_RSP message with the received channel allocation information.

The sender 1312 receives data from the message generator 1310, encodes and modulates the received data, converts the modulated data to an RF signal, and outputs the RF signal via an antenna.

Figure 14:
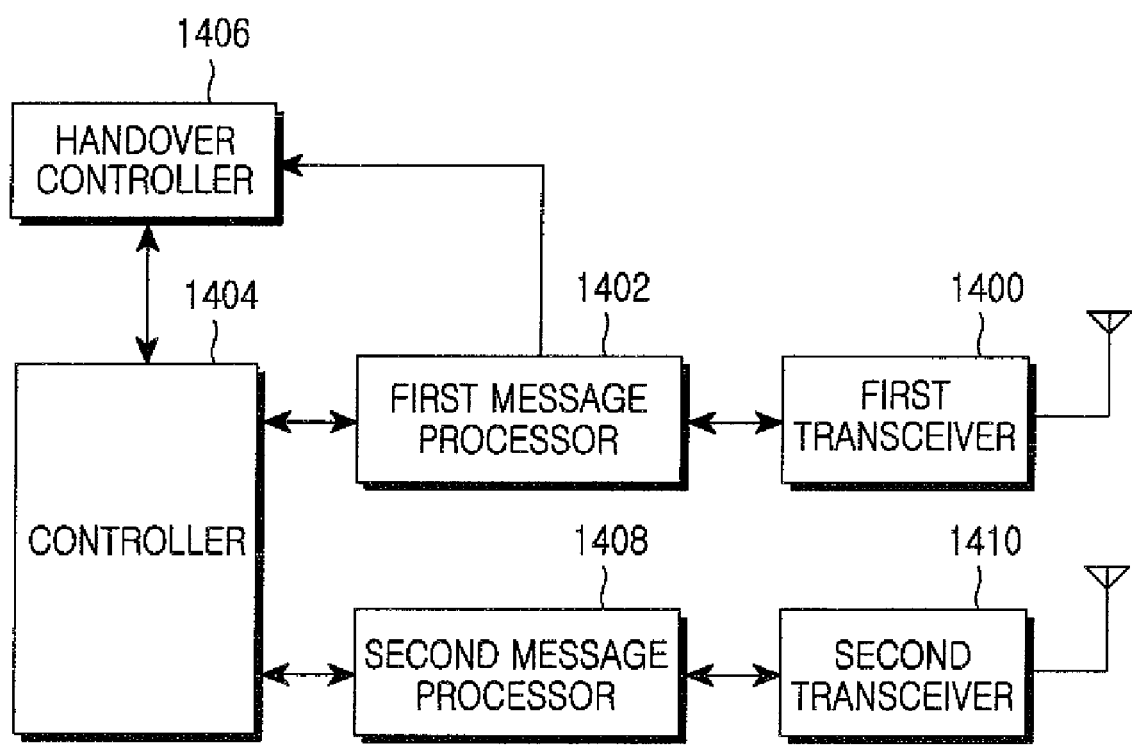
FIG. 14 is a block diagram of a terminal for a handover between a heterogeneous communication system and a broadband wireless communication system, in the broadband wireless communication system according to an exemplary embodiment of the present invention.

FIG. 14 is a block diagram of the terminal for the handover between the heterogeneous communication system and the broadband wireless communication system, according to an exemplary embodiment of the present invention.

The terminal of FIG. 14 includes a first transceiver 1400, a first message processor 1402, a controller 1404, a handover controller 1406, a second message processor 1408, and a second transceiver 1410.

The first transceiver 1400, which may support the OFDM based physical layer, modulates/demodulates and encodes/decodes signals and exchanges the signals with the first message processor 1402.

The first message processor 1402 decomposes a control message input from the first transceiver 1400 and provides the result to the controller 1404 and the handover controller 1406. For instance, the first message processor 1402 processes the handover response message from the base station in relation to the handover or the message RNG_RSP including the channel allocation information for the handover between the heterogeneous network, provides the processed message to the handover controller 1406, and provides the other control messages to the controller 1404. The first message processor 1402 generates a message with the various information provided from the controller 1404 and outputs the message to the first transceiver 1400.

The controller 1404 processes the information provided from the message processor 1402 and provides the processed result to the first message processor 1402.

The handover controller 1406 receives the handover related information from the first message processor 1402, measures the RSSI of the downlink, and reports the measured RSSI to the base station. Also, the handover controller 1406 receives the channel allocation information for the handover and attempts the handover to the heterogeneous communication system.

The second message processor 1408 decomposes a control message input from the second transceiver 1410 and provides the result to the controller 1404. In the handover, the second message processor 1408 generates a message for the channel connection to the heterogeneous communication system.

The second transceiver 1410, which may support the CDMA physical layer, modulates/demodulates and encodes/decodes signals and exchanges the signals with the second message processor 1408.

As set forth above, the periodic RSSI report, the handover information to the dummy cell, and the active set information are used in the border cell of the broadband wireless communication system. Therefore, when the dual-mode dual-band terminal gets out of the service coverage area of the broadband wireless communication system, it can be handed over to the heterogeneous communication system seamlessly.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a base station of a border cell of a broadband wireless communication system for a handover between the broadband wireless communication system and a target heterogeneous communication system, the method comprising:
    when a terminal enters the border cell of the broadband wireless communication system, sending, by the base station, a message, requesting to measure a signal level of a downlink, to the terminal using a modem for the broadband wireless communication system;
    when a signal level measured by the terminal falls below a preset threshold, requesting, by the base station, a handover to the target heterogeneous communication system over a core network;
    receiving, by the base station, a message, including channel allocation information for acquiring an UpLink (UL) channel of the target heterogeneous communication system, from the target heterogeneous communication system; and
    forwarding, by the base station, the message, including the channel allocation information, to the terminal using the modem for the broadband wireless communication system.

2. The operating method of claim 1, wherein the channel allocation information is added to a ranging response (RNG_RSP) message.

3. An operating method of a terminal for a handover between a broadband wireless system and a target heterogeneous communication system, the method comprising:
    receiving, by the terminal using a first modem for the broadband wireless communication system, a message, requesting a measurement of a signal level of a downlink, from a base station of the broadband wireless system;
    sending, by the terminal using the first modem for the broadband wireless communication system, a message, reporting of the signal level of the downlink, to the base station;
    receiving, by the terminal using the first modem for the broadband wireless communication system, a message, including channel allocation information for acquiring an UpLink (UL) channel of the target heterogeneous communication system to the target heterogeneous communication system, from the base station; and
    attempting, by the terminal using a second modem for the target heterogeneous communication system, the handover to the target heterogeneous communication system using the channel allocation information received from the broadband wireless communication system.

4. The operating method of claim 3, wherein the channel allocation information is received when the downlink signal level falls below a threshold after the terminal enters a border cell.

5. The operating method of claim 3, wherein the attempting of the handover comprises acquiring an uplink resource and sending a handover complete report message.

6. An operating method of a base station of a border cell of a broadband wireless communication system for a handover between the broadband wireless communication system and a target heterogeneous communication system, the method comprising:
    when a terminal attempts a handover to a dummy cell of the broadband wireless communication system or when an active set of cells of the broadband wireless communication system includes only a border cell, requesting, by the base station, the handover to the target heterogeneous communication system;

receiving, by the base station, a message, including channel allocation information for acquiring an UpLink (UL) channel of the target heterogeneous communication system, from the target heterogeneous communication system; and forwarding, by the base station, the message, including the channel allocation information, to the terminal using a modem for the broadband wireless communication system.

7. The operating method of claim 6, further comprising:
sending, by the base station, a handover response message relating to the dummy cell.

8. The operating method of claim 6, further comprising:
receiving, by the base station, a MOB_HO_ND message, informing of the handover to the dummy cell, from the terminal.

9. The operating method of claim 6, wherein the channel allocation information is added to a ranging response (RNG_RSP) message.

10. An operating method of a terminal for a handover between a broadband wireless communication system and a target heterogeneous communication system, the method comprising:

when a signal level of a downlink falls below a preset handover threshold, sending, by the terminal, a handover request to a base station of the broadband wireless communication system;

after requesting the handover, receiving, by the terminal using a first modem for the broadband wireless communication system, a message, including channel allocation information for acquiring an UpLink (UL) channel of the target heterogeneous communication system to the target heterogeneous communication system, from the base station; and attempting, by the terminal using a second modem for the target heterogeneous communication system, the handover to the heterogeneous communication system using the channel allocation information received from the broadband wireless communication system.

11. The operating method of claim 10, wherein the channel allocation information is received when the handover is performed to a dummy cell of the broadband wireless communication system.

12. The operating method of claim 10, wherein the channel allocation information is received when an active set of the broadband wireless communication system includes only a border cell.

13. A base station of a border cell of a broadband wireless communication system for a handover between the broadband wireless communication system and a target heterogeneous communication system, the base station comprising:

a controller for sending, to a terminal using a modem for the broadband wireless communication system, a message requesting a measurement of a signal level of a downlink, when the terminal enters the border cell of the broadband wireless communication system;

a handover processor for requesting a handover to the target heterogeneous communication system over a core network, when a signal level measured by the terminal falls below a preset threshold; and an interface for receiving a message, including channel allocation information for acquiring an UpLink (UL) channel of the target heterogeneous communication system, from the target heterogeneous communication system, wherein the controller forwards the message, including the channel allocation information, to the terminal using the modem for the broadband wireless communication system.

14. The base station of claim 13, wherein the channel allocation information is added to a ranging response (RNG_RSP) message.

15. A terminal for a handover between a broadband wireless communication system a target heterogeneous communication system, the terminal comprising:

a controller for receiving a message requesting a measurement of a signal level of a downlink from a base station of the broadband wireless communication system and for sending a message reporting of the signal level of the downlink to the base station, based on a first modem for the broadband wireless communication system; and a handover controller for receiving a message including channel allocation information for acquiring an UpLink (UL) channel of the target heterogeneous communication system to the target heterogeneous communication system from the base station based on the first modem for the broadband wireless communication system, and for attempting the handover to the heterogeneous communication system using the channel allocation information received from the broadband wireless communication system based on a second modem for the target heterogeneous communication system.

16. The terminal of claim 15, wherein the channel allocation information is received when a downlink signal level falls below a threshold after the terminal enters a border cell of the broadband wireless communication system.

17. The terminal of claim 15, wherein the message generator acquires an uplink resource and sends a handover complete report message.

18. A base station of a border cell of a broadband wireless communication system for a handover between the broadband wireless communication system a target heterogeneous communication system, the base station comprising:

a handover processor for requesting a handover to the target heterogeneous communication system, when a terminal attempts the handover to a dummy cell of the broadband wireless communication system or when an active set of the broadband wireless communication system includes only a border cell; and a controller for receiving a message including channel allocation information for acquiring an UpLink (UL) channel of the target heterogeneous communication system from the target heterogeneous communication system and for forwarding the message including the channel allocation information to the terminal using a modem for the broadband wireless communication system.

19. The base station of claim 18, wherein the controller sends a handover response message relating to the dummy cell.

20. The base station of claim 18, wherein the controller receives, a message MOB_HO_IND informing of the handover to the dummy cell, from the terminal.

21. The base station of claim 18, wherein the channel allocation information is added to a ranging response (RNG_RSP) message.

22. A terminal for a handover between a broadband wireless system and a target heterogeneous communication system, the terminal comprising:

a controller for sending a handover request to a base station of the broadband wireless communication system, when a signal level of a downlink falls below a preset handover threshold, based on a first modem for the broadband wireless communication system; and a handover controller for, after requesting the handover, receiving a message, including channel allocation information for acquiring an UpLink (UL) channel of the target heterogeneous communication system to the target heterogeneous communication system, based on the first modem for the broadband wireless communication system, from the base station and for attempting the handover to the heterogeneous communication system using the channel allocation information received from the broadband wireless communication system, based on a second modem for the target heterogeneous communication system.

23. The terminal of claim 22, wherein the channel allocation information is received when the handover is performed to a dummy cell of the broadband wireless communication system.

24. The terminal of claim 22, wherein the channel allocation information is received when an active set of the broadband wireless communication system includes only a border cell.

* * * * *